United States Patent
Lee et al.

(10) Patent No.: US 7,754,262 B2
(45) Date of Patent: Jul. 13, 2010

(54) METHOD OF PRODUCING MIXED GREENS

(75) Inventors: Chang Yong Lee, Seoul (KR); Ye Jin Oh, Seoul (KR); Heon Woong Jung, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 652 days.

(21) Appl. No.: 11/665,691

(22) PCT Filed: Oct. 26, 2005

(86) PCT No.: PCT/KR2005/003579
§ 371 (c)(1),
(2), (4) Date: Apr. 18, 2007

(87) PCT Pub. No.: WO2006/054837
PCT Pub. Date: May 26, 2006

(65) Prior Publication Data
US 2009/0047399 A1    Feb. 19, 2009

(30) Foreign Application Priority Data
Nov. 19, 2004    (KR) ...................... 10-2004-0095390

(51) Int. Cl.
*A23L 3/10* (2006.01)
(52) U.S. Cl. ................ 426/325; 426/326; 426/335; 426/401; 426/407; 426/412; 426/506; 426/521
(58) Field of Classification Search ......... 426/324–326, 426/335, 615, 392, 401, 407, 412, 506, 507, 426/521
See application file for complete search history.

(56) References Cited

U.S. PATENT DOCUMENTS

| | | | | |
|---|---|---|---|---|
| 1,661,140 | A * | 2/1928 | Gerardus et al. | 422/38 |
| 2,305,643 | A * | 12/1942 | Stevenson et al. | 426/252 |
| 4,832,963 | A * | 5/1989 | Demeulemeester et al. | 426/8 |
| 4,844,933 | A * | 7/1989 | Hsieh et al. | 426/521 |
| 4,933,411 | A * | 6/1990 | Gifford | 426/399 |
| 5,114,725 | A * | 5/1992 | Leake et al. | 426/270 |
| 5,320,856 | A * | 6/1994 | Veronesi et al. | 426/392 |
| 5,607,712 | A * | 3/1997 | Bourne | 426/321 |
| 6,387,430 | B1 * | 5/2002 | Gillette et al. | 426/520 |
| 7,247,330 | B2 * | 7/2007 | Kuethe et al. | 426/325 |
| 2004/0156960 | A1 * | 8/2004 | Villota et al. | 426/325 |
| 2006/0019002 | A1 * | 1/2006 | Xue | 426/326 |

FOREIGN PATENT DOCUMENTS

| | | |
|---|---|---|
| JP | 11-000103 A | 1/1999 |
| JP | 2000-175620 A | 6/2000 |
| KR | 1996-0016749 A | 6/1996 |
| KR | 1997-0032407 B1 | 7/1997 |

* cited by examiner

*Primary Examiner*—Drew E Becker
(74) *Attorney, Agent, or Firm*—Porzio, Bromberg & Newman, P.C.

(57) ABSTRACT

A method is provided for preparing mixed greens. Greens are immersed in an aqueous solution containing phosphoric acid, calcium chloride and a natural antibiotic, dewatered from their surfaces, cooked and mixed in predetermined amounts. Following the application of a seasoning solution containing an organic acid and a natural antibiotic thereto, the mixed greens are vacuum packed and thermally sterilized. The mixed greens prepared according to the method can preserve their fresh texture senses for a long period of time.

5 Claims, 1 Drawing Sheet

METHOD OF PRODUCING MIXED GREENS

TECHNICAL FIELD

The present invention relates, in general, to a method of producing mixed greens and, more particularly, to a method of producing mixed greens, by which the mixed greens can be stored for a long period of time at room temperature as well as in a refrigerated condition without loss of fresh tastes or texture.

BACKGROUND ART

Generally, in carrots or bellflower roots, microorganisms are found to exist at a density of $10^7$ CFU/g therein, out of which pore-forming thermostable microorganisms, resistant to heat, exist at a density of $10^1$ CFU/g or more. Also, parboiled green bean sprouts or asters have microorganisms at a density of $10^2$~$10^5$ CFU/g, with thermally resistant microorganisms at a density of $10^1$ CFU/g. In the case of dried brackens, thermally resistant microorganisms live at a density of $10^2$ CFU/g.

Thus, when various greens are cooked in a household, microorganisms are impossible to control completely, so that the greens, although cooked, are poor in preservability. Microorganisms may grow in the greens even while they are stored in a refrigerator after being cooked. Parboiled greens and dishes made therefrom also suffer from the same problems.

Microorganism control, which is indispensable for the storage of greens for a long period of time, is difficult to conventionally apply to greens. Retort sterilization, one of the most typical methods for inhibiting microbial growth, which is achieved by autoclaving at 121° C. for 4 min, is not applied to greens because it makes greens too frail. A pH reduction to 4.2 or below can control microorganisms, but makes the greens too acidic to eat.

Methods have been suggested for improving the freshness and preservability of greens by applying germanium compounds thereto (Korean Patent No. 10-0050101-0000) or by treating with chitosan and drying (Korean Pat. Laid-Open Publication No. 10-2003-0055223). These methods, however, are not adapted for ready-to-eat foods, and also suffer from the same problems as mentioned previously when being cooked. Due to the negative opinions of consumers on irradiated foods, irradiation with gamma rays (Korean Pat. No. 10-0045869-0000) can be carried out with only a low commercial success rate.

DISCLOSURE

Technical Problem

Leading to the present invention, intensive and thorough research, conducted by the present inventor, into the storage of greens, resulted in the finding that various greens including green bean sprouts, carrots, brackens, bellflower roots, asters, etc., can be stored for a prolonged period of time in a refrigerated condition or at room temperature without loss of fresh taste by being immersed in a preservation solution containing phosphoric acid, calcium chloride and a natural antibiotic, and seasoned with a seasoning solution containing an organic acid and a natural antibiotic.

Thus, it is an object of the present invention to provide a method for preparing mixed greens, which allows the mixed greens to be stored for a prolonged period of time without loss of their fresh taste.

Technical Solution

In order to accomplish the above object, the present invention provides a method for preparing mixed greens, comprising: immersing the greens in an aqueous solution containing phosphoric acid, calcium chloride and a natural antibiotic; removing water from the surfaces of the greens; cooking and mixing the greens; applying a seasoning solution containing an organic acid and a natural antibiotic to the mixed greens; vacuum packing the mixed greens; and thermally sterilizing the mixed greens.

BEST MODE

Figure 1:
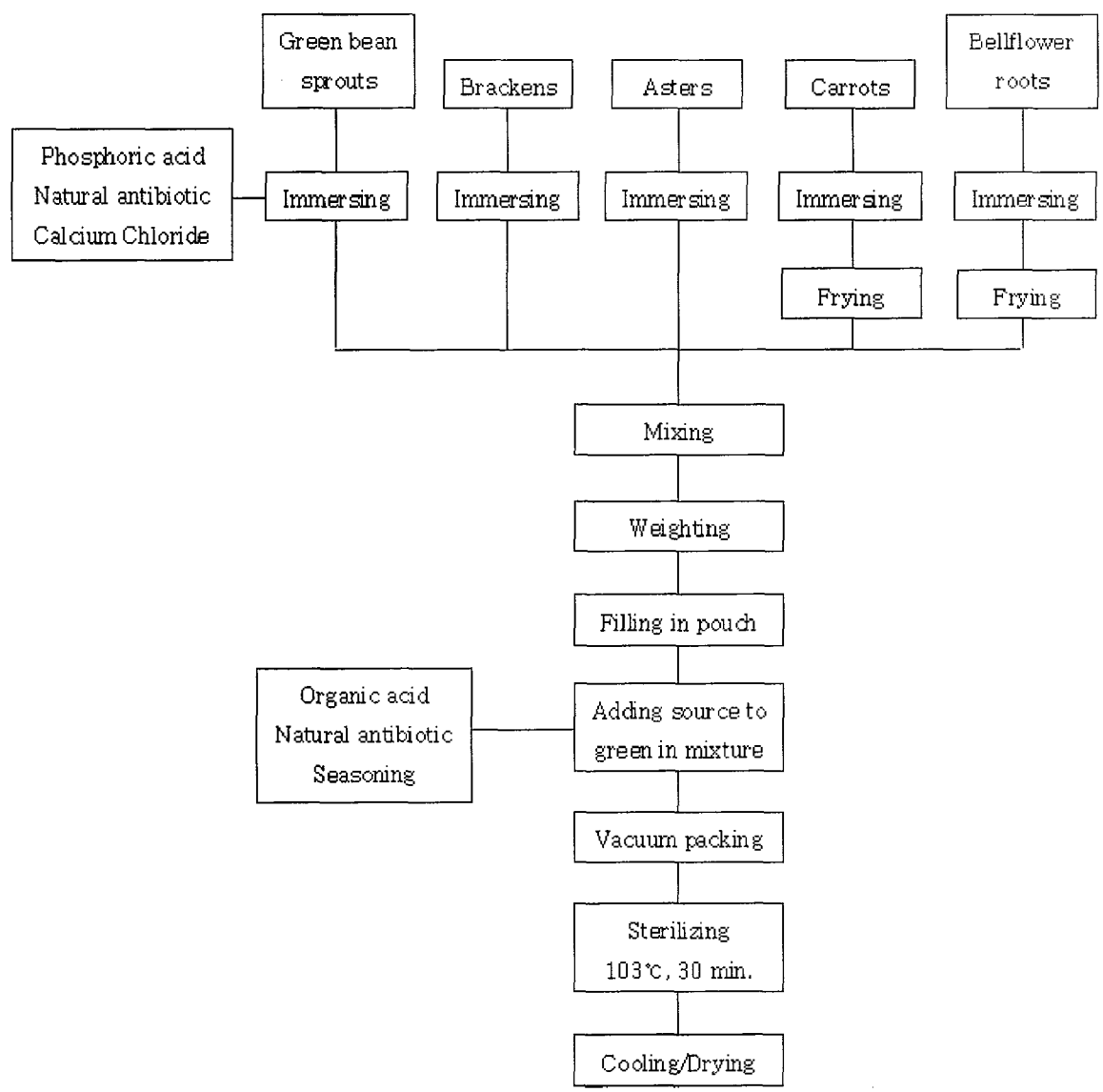
FIG. 1 is a flow chart showing processes of preparing mixed greens in accordance with the present invention.

The method of the present invention is carried out by immersing greens in an aqueous solution containing 0.1~0.3% of phosphoric acid, 0.02~0.04% of calcium chloride and 0.5~1% of a natural antibiotic; cooking greens with seasonings; weighing the mixed greens in a predetermined weight; adding a seasoning solution containing a natural antibiotic and an organic acid to the mixed greens; vacuum packing the mixed greens; and sterilizing the packed greens by heat.

In accordance with the method of the present invention, various mixed greens can be protected from microorganisms, with their own fresh tastes preserved over a prolonged period of time.

In the present invention, a method is provided for preserving mixed greens for a long period of time without loss of their fresh taste, wherein the mixed greens are immersed in an aqueous solution containing phosphoric acid, calcium chloride and a natural antibiotic, drained, cooked, seasoned, mixed with a seasoning solution containing an organic acid and a natural antibiotic, vacuum packed, and sterilized by heat.

In detail, mixed greens are immersed in an aqueous solution containing 0.1~0.3% of phosphoric acid, 0.02~0.04% of calcium chloride and 0.5~1% of a natural antibiotic for 2 hours, and drained. After being properly cooked, the mixed greens are weighed in a predetermined value, mixed with a seasoning solution containing organic acid, a natural antibiotic and various seasonings, vacuum packed, and heated at 100~103° C. for 20~30 min for sterilization. The mixed greens treated according to the method of the present invention are found to be preserved for 5 months at room temperature as well as in a refrigerated condition, without loss of fresh taste.

The method of the present invention is applicable to any green if it is edible, and preferably to green bean sprouts, carrots, brackens, bellflower roots and asters.

Immersion in the aqueous solution for about 2 hours reduces the number of microorganisms existing in greens, such as green bean sprouts, carrots, brackens, bellflower roots, asters, etc., with the cellulose texture thereof remaining unchanged.

In the aqueous solution, 0.1~0.3% of phosphoric acid, 0.02~0.04% of calcium chloride and 0.5~1% of a natural antibiotic are contained.

Depending on the level of microorganisms in the greens, the phosphoric acid and the natural antibiotic may vary in concentration.

For example, when the level of microorganisms in the greens is low, concentrations of phosphoric acid and a natural antibiotic can be reduced down to 0.1% and 0.5%, respectively. In contrast, a higher level of microorganisms requires a higher concentration of phosphoric acid, calcium chloride, and the natural antibiotic. However, phosphoric acid, calcium chloride and the natural antibiotic respectively provide a sour taste, a bitter taste and an offensive smell, having influence on food flavors. Accordingly, the concentrations of phosphoric acid and the natural antibiotic are limited to 0.3 and 1%, respectively.

The natural antibiotic useful in the present invention consists essentially of a grapefruit seed extract or a fermented pollen solution, and is exemplified by the commercial product manufactured by DaeKun P&C. Co., Korea, identified as DuoClean.

It is preferable that carrots and bellflower roots are cooked separately from other greens after the immersion. The greens may be cooked in various ways known to the art.

After the immersion and cooking steps, green bean sprouts, carrots, brackens, bellflower roots and asters are mixed in a predetermined ratio, and a predetermined amount of the mixture is filled in a heat-resistant polypropylene pouch.

The mixture ratio of the greens may be determined according to the trend of consumers, and is preferably comprised of 48 wt % of green bean sprouts, 20 wt % of carrots, 11 wt % of bellflower roots, 11 wt % of asters and 10 wt % of brackens.

In order to enhance the effect of the thermal treatment to be performed, as well as the preservability of the greens, a seasoning solution containing an organic acid and a natural antibiotic is added into the pouch filled with the greens.

The seasoning solution preferably contains an organic acid in an amount from 0.1 to 0.5% and a natural antibiotic in an amount from 0.1 to 0.5%.

The limits of the organic acid and the natural antibiotic are set to maintain minimum inhibitory activity against microorganisms while their respective sour and bitter tastes have no influence on the flavor of the greens within the upper limits.

According to pH values of the final product, the organic acid of the seasoning solution needs to be controlled. For example, when the final product is required to increase in pH, the concentration of the organic acid is decreased. On the other hand, when the final product needs to be sour in taste, the concentration of the organic acid is increased.

Afterwards, the pouch in which the greens are put is vacuum sealed so as to inhibit the growth of aerobic microorganisms.

Heating the vacuumed pouch at 100~103° C. for 20~30 min allows microorganisms to be controlled, without causing the texture of the greens to become frail. Cooling and drying processes are needed before production of the greens on a commercial basis.

The mixed greens thus obtained can be stored for 5 months or more at room temperature, as well as in a refrigerated condition.

MODE FOR INVENTION

A better understanding of the present invention may be obtained through the following examples which are set forth to illustrate, but are not to be construed as the limit of the present invention.

Experimental Example 1

Raw green bean sprouts, carrots, brackens, bellflower roots, and asters were each measured for levels of microorganisms that they, as controls, had. The greens were immersed in an aqueous solution containing 0.2% of phosphoric acid, 0.02% of calcium chloride and 0.7% of a natural antibiotic {'DuoClean', DaeKun P&C Ltd. Co., Korea} for 2 hours and measured for levels of microorganisms that were found thereon.

The levels of microorganisms were compared between the raw and the pre-treated greens and are summarized in Table 1, below.

TABLE 1

| | | | | | | (Unit: cfu/g) |
|---|---|---|---|---|---|---|
| State | Germs | Green bean sprouts | carrots | brackens | bellflower roots | asters |
| Untreated | General | $2.6*10^3$ | $3.0*10^5$ | — | $4.4*10^5$ | $6.0*10^6$ |
| Untreated | Thermostable | 20 | 20 | — | — | $2.0*10^3$ |
| Pretreated | General | — | $2.2*10^4$ | 20 | $3.0*10^4$ | $8.9*10^3$ |
| Pretreated | Thermostable | — | — | — | — | 20 |

Example 1

Green bean sprouts, carrots, brackens, bellflower roots, and asters in mixture were immersed in an aqueous solution containing 0.2% of phosphoric acid, 0.02% of calcium chloride and 0.7% of a natural antibiotic {'DuoClean', DaeKun P&C Ltd., Co. Korea} for 2 hours.

Example 2

After the pretreatment of Example 1, water was drained from the surfaces of the greens. Chopped carrots and bellflower roots, each in 100 g, were independently mixed with 1 g of salt and fried with oil. Green bean sprouts, brackens, and asters, each in 10 g, were independently mixed with 1 g of salt, 1 g of crushed garlic, 0.3 g of a seasoning (commercially available from CJ Corp., Korea, identified as 'Dashida'), and 0.1 mL of sesame oil. Thereafter, green bean sprouts, carrots, brackens, bellflower roots and asters were mixed in equal weights and put into a pouch, followed by the addition of a seasoning solution containing 0.3% of a natural antibiotic {commercially available from DaeKun P&C Ltd., Co. Korea, identified as 'DuoClean' } and 0.3% of an organic acid into the pouch. After being vacuum packed, the greens were sterilized at 103° C. for 30 min. The product thus obtained was measured to have pH 4.6.

Experimental Example 2

An examination was made of counts of the microorganisms inhibiting the mixed greens just after the vacuum packaging and at one-month intervals over 5 months of storage at 15° C. and 35° C. The results are shown in Table 2, below.

TABLE 2

| | | | | | | (Unit: cfu/g) |
|---|---|---|---|---|---|---|
| | Storage Periods (month) | | | | | |
| Germs | Initial | 1 | 2 | 3 | 4 | 5 |
| General | — | — | — | — | — | — |
| Thermostable | — | — | — | — | — | — |

Experimental Example 3

In order to examine and improve textures of the greens in each process, carrots, selected from the greens treated as in Example 1, the mixed greens processed as in Example 2, or the mixed greens which had the same composition as in Example 2 and were treated at 121° C. for 4 min, were analyzed for texture using a texture-testing instrument, such as that manufactured by Taketomo Inc., Japan, identified as Tensipresser.

Textures of carrots analyzed under the conditions mentioned above are summarized in Table 3, below. As is apparent from the data of Table 3, the carrots was improved in hardness when being thermally treated at 103° C. for 30 min after the pretreatment as compared with those when being not pretreated or being thermally treated at a higher temperature.

TABLE 3

| | Treatment Conditions | | (unit: gw) |
|---|---|---|---|
| Pretreatment | No Pretreatment | Pretreatment | |
| Thermal Treatment | 103° C., 30 min | 103° C., 30 min | 121° C., 4 min |
| Hardness | 102.25 | 682.75 | 178.08 |

Experimental Example 4

The mixed greens prepared in Example 2 were mixed with a product of boiled rice, such as that manufactured by CJ Corp. Korea, identified as 'Hetbahn', with a red pepper soybean paste (manufactured by Haechandle, Korea) added thereto, so as to prepare Bibimbap, a Korean traditional food, which was then subjected to a sensory test for 250 persons. The sensory test was performed for the texture sense and freshness of the mixed greens, and the taste of the Bibimbap.

The mixed greens prepared according to the present invention gained good marks in texture and taste, as summarized in Table 4, below.

TABLE 4

| Texture | Freshness | Food taste |
|---|---|---|
| 3.67 | 3.20 | 3.77 |

Note:
1. Each test item was evaluated on a maximum scale of 5 points.
2. Excellent: 5, Good: 4, Moderate: 3, Poor: 2, Very Poor: 1.

Although the preferred embodiment(s) of the present invention have (has) been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described hereinbefore, the method for preparing mixed greens can more effectively inhibit the growth of microorganisms on the greens through pH control, use of a natural antibiotic, and a thermal treatment at a lower temperature than that of conventional retort sterilization, thereby allowing the mixed greens to be stored for a long period of time without loss of fresh taste or texture. It can find useful applications in the food industry.

The invention claimed is:

1. A method for preparing mixed greens, comprising:
   immersing the greens in an aqueous solution containing phosphoric acid, calcium chloride and a natural antibiotic and removing water from the surfaces of the greens;
   cooking and mixing the greens;
   applying a seasoning solution containing an organic acid and a natural antibiotic to the mixed greens;
   vacuum packing the mixed greens; and
   thermally sterilizing the mixed greens.

2. The method as defined in claim 1, wherein the greens comprise green bean sprouts, carrots, brackens, bellflower roots and asters.

3. The method as defined in claim 1, wherein the aqueous solution contains phosphoric acid in an amount from 0.1 to 0.3%, calcium chloride in an amount from 0.02 to 0.04%, and a natural antibiotic in an amount from 0.5 to 1.0%, and the immersing is carried out for 2 hours.

4. The method as defined in claim 1, wherein the seasoning solution contains the organic acid in an amount from 0.1 to 0.5% and the natural antibiotic in an amount from 0.1 to 0.5%.

5. The method as defined in claim 1, wherein the thermally sterilizing is conducted at 100 to 103° C. for 20 to 30 min.

* * * * *